(12) United States Patent
Fulk et al.

(10) Patent No.: US 9,768,601 B2
(45) Date of Patent: *Sep. 19, 2017

(54) HIGH-CAPACITY/EFFICIENCY TRANSMISSION LINE DESIGN

(71) Applicant: AEP Transmission Holding Company, LLC, Columbus, OH (US)

(72) Inventors: Meihuan Zhu Fulk, Lewis Center, OH (US); Richard Gutman, Columbus, OH (US)

(73) Assignee: Bold Transmission, LLC, Columbus, OH (US)

(*) Notice: Subject to any disclaimer, the term of this patent is extended or adjusted under 35 U.S.C. 154(b) by 426 days.

This patent is subject to a terminal disclaimer.

(21) Appl. No.: 14/563,122

(22) Filed: Dec. 8, 2014

(65) Prior Publication Data

US 2015/0083483 A1    Mar. 26, 2015

Related U.S. Application Data

(63) Continuation of application No. 13/870,157, filed on Apr. 25, 2013, now Pat. No. 8,952,251.

(60) Provisional application No. 61/639,126, filed on Apr. 27, 2012.

(51) Int. Cl.
*H02G 7/00* (2006.01)
*H02G 7/20* (2006.01)

(52) U.S. Cl.
CPC ..................... *H02G 7/20* (2013.01)

(58) Field of Classification Search
CPC ............ H02G 7/14; H02G 7/20; H02G 7/056;
H02G 7/125; H02G 7/12; H02G 1/02;
H02G 7/02; H02G 15/117; H02G 7/06;
H02G 7/05; H02G 9/00; H02G 9/10;
(Continued)

(56) References Cited

U.S. PATENT DOCUMENTS

| 3,002,043 A | 9/1961 | Jenner |
| 3,005,609 A | 10/1961 | Joffe |
| D211,089 S | 5/1968 | Dreyfuss |

(Continued)

FOREIGN PATENT DOCUMENTS

| CN | 202578097 U | 12/2012 |
| EP | 0089808 A2 | 9/1983 |

(Continued)

OTHER PUBLICATIONS

D'Ajello et al., Quantitative Evaluation of the Visual Impact of Overhead Lines, CIGRE 1996, 10 pages.

(Continued)

*Primary Examiner* — Pete Lee
(74) *Attorney, Agent, or Firm* — Morgan, Lewis & Bockius LLP; Adam D. Brooke; John D. Zele (57) ABSTRACT

A transmission tower structure for suspending from an arched crossarm a three phased circuit arranged in a compact delta configuration that improves the surge impedance loading (SIL) of a transmission line, reduces its series impedance, lowers both resistive and corona losses, and moderates electromagnetic fields and audible noise effects at the ground level—all achieved in a cost effective manner. The structure further has a low overall height and aesthetic appearance enhancing the public acceptance of the embodiments.

25 Claims, 9 Drawing Sheets

(58) Field of Classification Search
CPC ....... F16L 3/1233; H01R 4/643; H01B 17/00; H01B 3/00; H01B 1/00; H01B 7/00
See application file for complete search history.

(56) References Cited

U.S. PATENT DOCUMENTS

| | | | |
|---|---|---|---|
| 3,439,107 A | 4/1969 | Scott | |
| 3,509,678 A | 5/1970 | Dake | |
| 3,571,991 A | 3/1971 | Doocy et al. | |
| 3,603,717 A | 9/1971 | Scott | |
| 3,803,345 A | 4/1974 | Spaeth | |
| 3,916,087 A | 10/1975 | Trinh et al. | |
| D242,765 S | 12/1976 | Patrick | |
| 4,219,742 A | 8/1980 | Ponder | |
| 4,458,102 A * | 7/1984 | White | H02G 7/20 174/149 R |
| 5,391,929 A | 2/1995 | Kalyon | |
| D369,785 S | 5/1996 | Cotee | |
| D381,096 S | 7/1997 | Tallon | |
| D387,881 S | 12/1997 | Tallon | |
| D402,379 S | 12/1998 | Mimram | |
| 6,031,187 A | 2/2000 | Giampieretti | |
| 7,057,103 B1 * | 6/2006 | Peabody | H02G 7/14 174/40 R |
| 7,501,574 B1 | 3/2009 | Graham | |
| 7,530,539 B2 | 5/2009 | Boschetti | |
| D610,087 S | 2/2010 | Johnson | |
| D613,686 S | 4/2010 | Mueller | |
| 7,732,708 B1 | 6/2010 | Peabody | |
| 8,054,195 B2 | 11/2011 | Holsomback | |
| 8,122,647 B2 * | 2/2012 | Lee | E04H 12/24 174/44 |
| 2008/0156524 A1 | 7/2008 | Jachim et al. | |
| 2010/0064598 A1 | 3/2010 | Lee et al. | |
| 2010/0163298 A1 | 7/2010 | Shim | |

FOREIGN PATENT DOCUMENTS

| | | |
|---|---|---|
| EP | 1128513 | 8/2001 |
| WO | WO9426013 | 11/1994 |
| WO | WO03077393 | 9/2003 |

OTHER PUBLICATIONS

Heidari et al., Effect of Land Price on Transmission Line Design, CIGRE 2002, 6 pages.

Arabani et al., An Optimum 4 Circuit (2×230 +2×63) Kv T.L. in Tehran Urban Area with Minimum Environmental Impact, CIGRE 2002, 3 pages.

Clerici et al., AC and/or DC Substantial Power Upgrading of Existing OHTL Corridors, Sep. 1991, 6 pages.

Krylov, Design, Mechanical Aspects and other Subjects of compact EHV OHL Technology, Midwest—Expanding Edge Seminar, Sep. 2004, 46 pages.

Savvaitov et al., A 110 kV Overhead Transmission Line of Compact Type: Design, Operating Experience, Conductor Oscillation Control, CIGRE 1991, 5 pages.

Chan, 500-kV Transmission Line Design Overview of Design Parameter Interdependencies, Feb. 2011, Chapters 9-12, Electric Power Research Institute Technical Update.

Ellert et al., EHV-UHV Transmission Systems, EPRI AC Transmission Line Reference Book-345 kV and Above, Second Edition, Second addition revised 1987, Electric Power Research Institute.

Reynders et al., Chapter 1—Transmission Systems, EPRI AC Transmission Line Reference Book-200 kV and Above, Third Edition, 2005, Electric Power Research Institute.

Douglass et al., Chapter 2—Electrical Characteristics of Conductor Con gurations and Circuits, EPRI AC Transmission Line Reference Book-200 kV and Above, Third Edition, 2005, Electric Power Research Institute.

Abi-Samra et al., Chapter 3—Insulation Design, EPRI AC Transmission Line Reference Book-200 kV and Above, Third Edition, 2005, Electric Power Research Institute.

Phillips et al., Chapter 4—Insulation for Power Frequency Voltage, EPRI AC Transmission Line Reference Book-200 kV and Above, Third Edition, 2005, Electric Power Research Institute.

Zaffanella, Chapter 5—Switching Surge Performance, EPRI AC Transmission Line Reference Book-200 kV and Above, Third Edition, 2005, Electric Power Research Institute.

Chisholm et al., Chapter 6—Lightning and Grounding, EPRI AC Transmission Line Reference Book-200 kV and Above, Third Edition, 2005, Electric Power Research Institute.

Olsen et al., Chapter 9—Electromagnetic Interference, EPRI AC Transmission Line Reference Book-200 kV and Above, Third Edition, 2005, Electric Power Research Institute.

Britten et al., Chapter 10—Audible Noise, EPRI AC Transmission Line Reference Book-200 kV and Above, Third Edition, 2005, Electric Power Research Institute.

Maruvada, Chapter 11—Corona Loss and Ozone, EPRI AC Transmission Line Reference Book-200 kV and Above, Third Edition, 2005, Electric Power Research Institute.

Olsen et al., Chapter 12—Shared Use of the Right-of-Way, EPRI AC Transmission Line Reference Book-200 kV and Above, Third Edition, 2005, Electric Power Research Institute.

Stewart et al., Chapter 13—Considerations for Inspection and Maintainability, EPRI AC Transmission Line Reference Book-200 kV and Above, Third Edition, 2005, Electric Power Research Institute.

Douglass et al., Chapter 14—Voltage Upgrading of Existing Transmission Lines, EPRI AC Transmission Line Reference Book-200 kV and Above, Third Edition, 2005, Electric Power Research Institute.

Chartier et al., Chapter 15—Transmission Lines Above 700 kV, EPRI AC Transmission Line Reference Book-200 kV and Above, Third Edition, 2005, Electric Power Research Institute.

Communication dated Jul. 14, 2016 from the European Patent Office in counterpart European application No. 13781498.4.

[D2] Electric Power Research Institute: "Figure 2.10 Typical pole- and lattice-type structures for 345kV transmission systems," Jan. 1, 1979 (Jan. 1, 1979), XP055282889.

[D4] Electric Power Research Institute: "Typical 500kV lattice, pole guyed V- and Y-type structures," (Figs. 2.12) Jan. 1, 1979 (Jan. 1, 1979 ), XP055282892.

Notification Concerning Transmittal of International Preliminary Report on Patentability, dated Nov. 6, 2014, from the International Bureau in counterpart international application No. PCT/US2013/040965.

Bystrup—Architecture, Design & Engineering, T-Pylon, Pylon Design Competition, Royal Institute of British Architects, p. 6, www.ribapylondesign.com, Jul. 2011.

M.S. Nashid et al, Increasing the Power Transfer Capability of Transmision Lines on Existing Right-of-way in Ontario Hydro, CIGRE 1992 Session Proceedings, paper 22-201, Paris.

J.G. Cassan 7 O. Nigol, Research on Compact Transmission Lines in Ontario, CIGRE 1972 Sesion Proceedings, paper 31-07, Paris, France.

Paolo Villa et al, Compact Transmission Line With Inverted Delta Configuration, CIGRE 2002, paper 22-103, Paris, France.

Stoffel, et al., Electric power high-voltage transmission lines: Design options, cost, and electric and magnetic field levels, Environmental Assessment Division, Argonne National Laboratory, Nov. 1994.

Conti, et al.; Technical solutions to reduce 50 Hz magnetic fields from power lines, Power Tech Conference Proceedings, 2003 IEEE Bologna, Jun. 23-26, 2003.

Narain et al., Uprating of 275kV Lines to 400kV as Part of a Contingency Plan for Generation Integration, 2006 IEEE PES Transmission and Distribution Conference and Exposition Latin America, Venezuela.

Abetti et al., Economics of Single and Bundle Conductors for Extra-High-Voltage Transmission, Abetti, Lindh, Simmons—Conductors for EHV Transmission, pp. 138-147, Jun. 1960.

(56) References Cited

OTHER PUBLICATIONS

Bin et al., Typical Models of Compact Transmission Lines and Application Prospect in 500KV AC System of China, 1998 IEEE, pp. 218-222.
Broschat et al., Compaction Techniques Applied to Subtransmission Line Uprating 41.6 KV to 115 KV, IEEE Transactions on Power Apparatus and Systems, pp. 1959-1965, vol. PAS-100, No. 4, Apr. 1981.
Burnham et al, High Strength Polymer Post Insulators Enable Economical Transmission Lines With Low Environmental Impact, 1994 IEEE, pp. 494-503.
Chai, et al., Flexible Compact AC Transmission System—a New Mode for Large-capacity and Long-distance Power Transmission, 2006 IEEE, pp. 1-6.
Gabrielle, et al., Electrical constants and Relative Capacities of Bundled-Conductor Transmission Lines, Gabrielle, Marchenko, Vassell—Bundled-Conductor Transmission Lines, pp. 78-92, Jan. 1964.
Nayak et al., EHV Transmission Line Capacity Enhancement through Increase in Surge Impedance Loading Level, 2006 IEEE, pp. 1-4.
Ordon et al., Considerations in the Design of Three Phase Compact Transmission Lines, 1995 IEEE, pp. 108-114.
Alexandrov et al, Overhead Line Designing in View of Environmental Constraints. Compact Overhead Lines., CIGRE 1998, 6 pages.
Loudon et al, A Compact 420 kV Line Utilising Line Surge Arresters for Areas With Low Isokeraunic Levels, CIGRE 1998, 9 pages.
Yafang et al, Study of 500kV Compact Transmission Technology, CIGRE 1998, 7 pages.
Villa et al, Compact Transmission Line With Inverted Delta Configuration, CIGRE 2002, 4 pages.
Tsanakas et al, Compact and Optimum Phase Conductor Arrangement for the Reduction of Electric and Magnetic Fields of Overhead Lines, CIGRE 2000, 6 pages.
Liu et al, Experimental flashover research on Switching Impulse of 750 kV Single Circuit Compact Transmission Power Tower, CIGRE 2010, 12 pages.
Gong et al., Test on the First 500 kV Compact Transmission Line in China, 2000 IEEE, pp. 173-178.
Wei-Gang, Study on Conductor Configuration of 500 kV Chang-Fang Compact Line, IEEE Transactions on Power Delivery, vol. 18, No. 3, Jul. 2003, pp. 1002-1008.
Zobel et al., Narrower Transmission Corridors Made Possible with New Compacted Conductor Support Systems for EHV and UHV Lines, CIGRE International Conference on Large High Voltage Electric Systems, Aug. 27-Sep. 4, 1980, 16 pages.
Boos et al., Experiences Gained in the Operation of Multiple Circuit High Voltage Overhead Lines of Compact Design, CIGRE International Conference on Large High Voltage Electric Systems, Aug. 27-Sep. 4, 1986, 9 pages.
Regis et al, Expanded Bundle Technique: The Application of HSIL TL Concept to Increase the Capacity of Overhead Lines, CIGRE 1998, 7 pages.
Fernandes et al., 500 kV Compact Line of Eletronorte Brazil—Conception, Electrical and Mechanical Design, CIGRE International Conference, Aug. 26-Sep. 1, 1990 9 pages.
Gingras et al, Review of the Hydro-Quebec System Operation with Series Compensation, CIGRE 2000, 6 pages.
Clerici et al., Compact versus Conventional EHV Lines: Technical and Economical Comparisions, paper, CIGRE International Conference on Large High Voltage Electric Systems, Aug. 29-Sep. 6, 1984, 8 pages.
Cassan et al., Research on Compact Transmission Lines in Ontario, paper, CIGRE International Conference on Large High Voltage Electric Systems, Aug. 28-Sep. 6, 1974, 9 pages.
Dubarton et al., Surge Impedance of Overhead Lines with Bundle Conductors during Short Line Faults, technical paper, CIGRE Electra Magazine No. 17, Apr. 1971, pp. 113-122.
Working Group 11 of Study Committee 22, Results of the Questionnaire on Interphase Spacers, technical paper, CIGRE ELECTRA Magazine No. 143, Aug. 1992, pp. 73-83.
Alexandrov et al., Improvement of the Efficiency of 36 to 220 kV Lines, International Conference on AC and DC Power Transmission, 1991, pp. 226-231.
Chartier et al., Corona Performance of a Compact 230-KV Line, IEEE Transactions on Power Delivery, vol. 10, No. 1, Jan. 1995, pp. 410-420.
Mousa, The Electric Fields at Ground Level Associated with the Inverted Delta Configuration, IEEE Transactions on Power Delivery, vol. PAS-100, No. 12, Dec. 1981, pp. 4913-4917.
Annestrand et al., Insulation Performance Analysis of a 500-kV Transmission Line Design, IEEE Transactions on Power Delivery, vol. PAS-89, No. 3, Mar. 1970, pp. 429-437.
Liao et al., Included Angle Selection of V-Shape Insulator String for 750-kV Compact Transmission Line, IEEE Transactions on Power Delivery, vol. 26, No. 1, Jan. 2011, pp. 385-393.
Dahab et al., Comparison of Magnetic-Field Distribution of Noncompact and Compact Parallel Transmission-Line Configurations, IEEE Transactions on Power Delivery, vol. 20, No. 3, Jul. 2005, pp. 2114-218.
Jonsson et al., Optimized Reduction of the Magnetic Field Near Swedish 400 kV lines by Advanced Control of Shield Wire Currents. Test Results and Economic Evaluation, IEEE Transactions on Power Delivery, vol. 9, No. 2, Apr. 1994, pp. 961-969.
Caola et al., Electric Field Control in the Vicinity of EHV Transmission Lines, IEEE Transactions on Power Delivery, vol. PAS-100, No. 4, Apr. 1981, pp. 2017-2025.
Gela et al., Application of Portable Protective Gaps for Live Work on Compact 550 kV Transmission Lines, IEEE Transactions on Power Delivery, vol. 11, No. 3, Jul. 1996, pp. 1419-1429.
Kaminaga et al., Development of Compact 500 kV 8000 a Gas Insulated Transmission Line-Dust Control During Field Joining and Method for Detecting Conductive Particles, IEEE Transactions on Power Delivery, vol. PWRD-2, No. 4, Oct. 1987, pp. 961-968.
Tsujimoto et al., Investigation of Conductor Swinging by Wind and Its Application for Design of Compact Transmission Line, IEEE Transactions on Power Delivery, vol. PAS-101, No. 11, Nov. 1982, pp. 4361-4369.
Melo et al., Electric and Magnetic Fields of Compact Transmission Lines, IEEE Transactions on Power Delivery, vol. 14, No. 1, Jan. 1999, pp. 200-204.
Kobayashi et al., Development of Compact 500 kV 8000 a Gas Insulated Transmission Line Study on Insulation Design, IEEE Transactions on Power Delivery, vol. PAS-103, No. 11, Nov. 1984, pp. 1354-1364.
Sakakibara et al., Development of Low-Wind Pressure Conductors for Compact Overhead Transmission Line, IEEE Transactions on Power Delivery, vol. PAS-103, No. 10, Oct. 1984, pp. 3117-3124.
Brierley et al., Compact Right-of-Ways with Multi-Voltage Towers, vol. 6, No. 4, Oct. 1991, pp. 1682-1689.
Vaisman et al., Switching Impulse Strength of Compact Transmission Lines, vol. 8, No. 3, Jul. 1993, pp. 1570-1578.
Rohlfs et al., Switching Impulse Strength of Compacted Transmission Line Flat and Delta Configurations, vol. PAS-102, No. 4, Apr. 1983, pp. 822-831.
Gela et al., Defective Insulators in Live Working on a 550 kV Compact Steel Lattice Tower, vol. 12, No. 2, Apr. 1997, pp. 783-790.
De La Rosa et al., Contributions to Lightning Research for Transmission Line Compaction, vol. 3, No. 2, Apr. 1988, pp. 716-723.
Barrett, Optimization of Conductor Design, vol. 4, No. 1, Jan. 1989, pp. 453-464.
Kimoto et al., Insulator Crossarms for 345-kV EHV Transmission Line, vol. PAS-90, No. 2, Mar./Apr. 1971, pp. 756-767.
Esmeraldo et al., A Proposed Design for the New Furnas 500 kV Transmission Lines the High Surge Impedance Loading Line, vol. 14, No. 1, Jan. 1999, pp. 278-286.
Egger et al, Experience with a 380 kV "Camouflage Line", CIGRE 1998, 5 pages.
Bohme et al, Overhead Transmission Lines: Design Aimed to Reduce the Permitting Time, CIGRE 1998, 5 pages.

(56) References Cited

OTHER PUBLICATIONS

Buckner, The Electricity Supply Industry and its Impact on Transmission Line Technology—Economical Aspects, CIGRE 2002, 10 pages.
First Office Action dated Mar. 23, 2017 from The State Intellectual Property Office of the People's Republic of China in counterpart Chinese 201380034099.0.

* cited by examiner

HIGH-CAPACITY/EFFICIENCY TRANSMISSION LINE DESIGN

CROSS-REFERENCE TO RELATED APPLICATIONS

This application is a continuation application of copending U.S. application Ser. No. 13/870,157, filed on Apr. 25, 2013, which claims the benefit of U.S. provisional patent application Ser. No. 61/639,126 filed on Apr. 27, 2012, both of which are hereby incorporated by reference in their entirety.

BACKGROUND OF THE INVENTIVE FIELD

The present invention is directed to high-capacity, high-efficiency alternating current (AC) overhead transmission lines. In one embodiment, a power transmission line with a three-phase compact delta configuration is suspended by a single crossarm. The present invention relates to a novel transmission line to maximize load-carrying ability, environmental compatibility, cost effectiveness, and public acceptance.

Public interest in clean, reliable power supplies, combined with renewable generation projects being developed in areas remote from load centers, demands transmission infrastructure capable of delivering efficiently large blocks of power over long distances. In view of the public opposition to overhead transmission in general, and 765 kilovolt (kV) (i.e., the highest transmission voltage class in the U.S.) in particular, electric utilities resort to building conventional 345 kV lines and augmenting such lines with series compensation to achieve the performance characteristics of higher-voltage transmission.

The transmission line design of the preferred embodiment boosts the performance of 345 kV lines beyond their traditional capabilities without relying on costly external devices, such as series capacitors. In the preferred embodiment, low-profile, aesthetic features minimize the environmental impact and structure costs, seeking to improve public acceptance of new transmission projects.

It has been established through engineering analysis and practice that load-carrying ability, or loadability, of a transmission line is limited by one or more of the following factors: (i) thermal rating, (ii) voltage-drop constraint, and (iii) steady-state stability limitation. Thermal rating is an outcome of the conductor and/or terminal equipment selection process, and is most limiting for lines shorter than 50 miles. Longer lines are limited primarily by voltage-drop and/or stability considerations, both of which are directly affected by the length-dependent impedance of the line.

For a given line length, the most effective method of reducing impedance and thereby improving loadability, is to raise the transmission voltage class. However, due to public opposition, multiple lower-voltage lines are built with series compensation to reduce the impedance and achieve the required loadability objectives.

Series compensation, traditionally, has been used as a near-term remedy to stretch the AC system capability. Also, in some areas, series-compensated lines serve as a substitute for higher-voltage transmission to transport sizable power blocks point-to-point over long distances. These applications invariably are accompanied by concerns such as subsynchronous resonance (SSR) and subsynchronous control interactions (SSCI), known to pose risks to electrical machinery and grid stability.

Other concerns include system protection complexities, maintenance and spare equipment requirements, electrical losses, limited life expectancy relative to that of the line itself, and future grid expandability challenges. Grid expandability is of particular concern when tapping the series-compensated line to serve a new load center or to integrate a new generating source because these developments: (i) can result in overcompensated line segments, and (ii) may be beyond the utility's control.

The new transmission line design, a 345 kV line in the preferred embodiment, minimizes these concerns while inherently offering the requisite capacity and efficiency for both long- and short-distance bulk power deliveries within the electrical grid.

SUMMARY OF THE GENERAL INVENTIVE CONCEPT

In all embodiments of the invention, a high-capacity, high-efficiency 345 kV overhead transmission line design offers performance advantages relative to typical configurations now in use in the electric utility industry. This design provides a viable alternative to the use of series-compensated 345 kV lines and/or higher-voltage lines for transporting efficiently large power blocks over long distances (e.g., 100 miles); one that is superior in terms of simplicity of design and engineering, construction and operation, grid expandability, life expectancy, and life cycle cost.

The preferred embodiment of the invention represents double-circuit (and single-circuit/double-circuit-capable) lines, characterized by a compact interphase configuration using bundled conductors suspended from structures with a low, aesthetic profile. The new structure preferably is comprised of a single arch-shaped tubular steel crossarm supporting both circuits symmetrically about a single tubular steel pole shaft. Three phases with two, three, four (or more) bundled conductors each are preferably held together in a "delta" arrangement by means of V-string suspension insulator assemblies and interphase insulators, while maintaining desired phase-to-structure insulator assembly connections. This preferred embodiment of the invention improves the surge impedance loading (SIL) of a transmission line (i.e., a measure of line loadability), reduces its series impedance, lowers both resistive and corona (air ionization) losses, and moderates electromagnetic fields (EMF) and audible noise effects at the ground level—all achieved in a cost effective manner.

BRIEF DESCRIPTION OF THE DRAWINGS

The following description of the example embodiments refers to the accompanying figures that form a part thereof. The description provides explanations by way of exemplary embodiments. It is to be understood that other embodiments may be used having mechanical and electrical changes that incorporate the scope of the present invention without departing from the spirit of the invention.

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
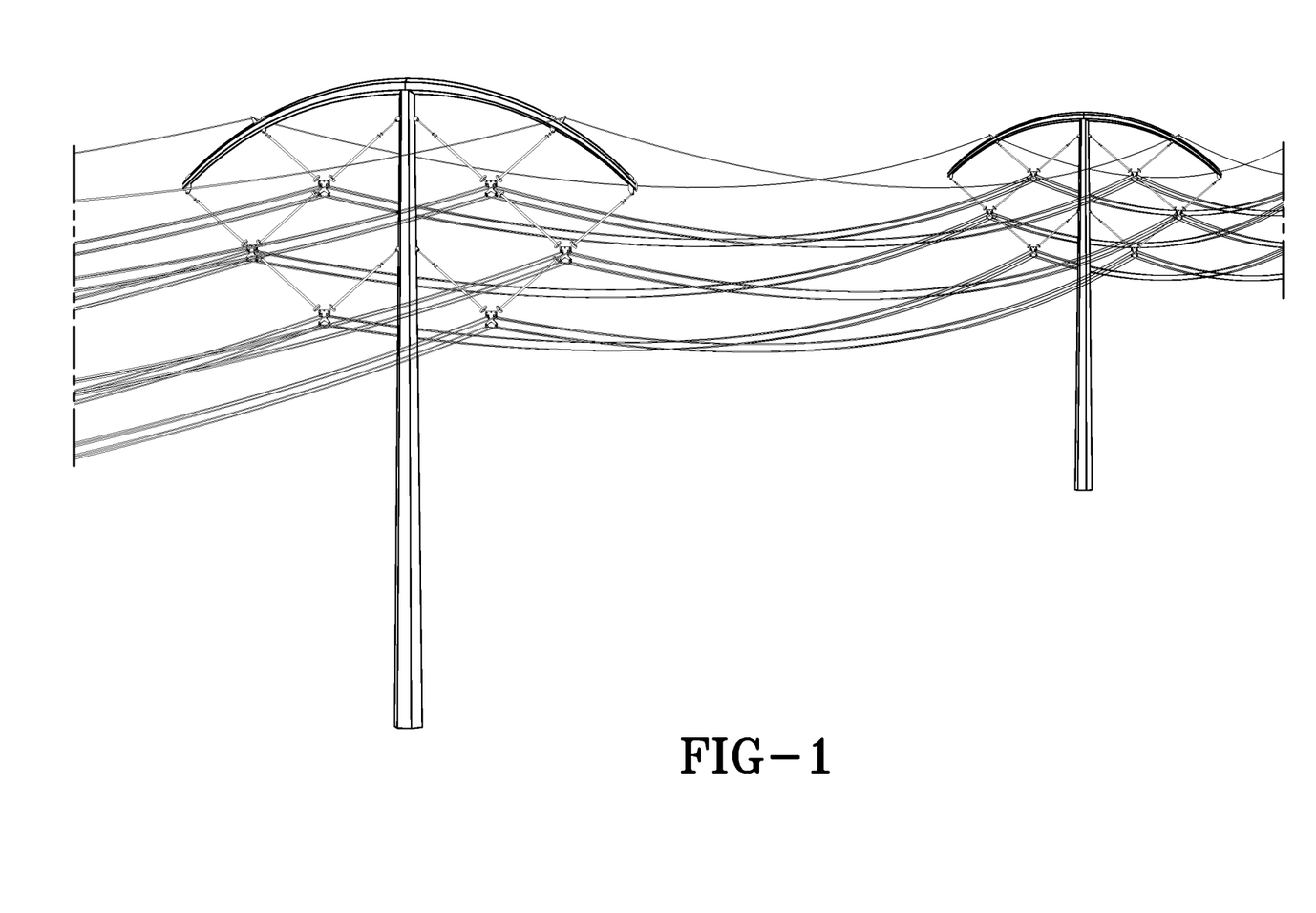
FIG. 1 illustrates the preferred embodiment of the transmission line of the present invention.

FIG. 1 shows the preferred embodiment of a 345 kV double-circuit line design of the present invention. It features a streamlined, relatively low-profile structure with phase-conductor bundles arranged into compact "delta" configurations by means of interphase insulators ("delta" means in a substantially triangular shape with internal angles in the range of 30 to 120 degrees). Compact delta configurations have the advantage of improved line surge impedance loading (SIL), lower series impedance, and reduced ground-level EMF effects ("compact" means a relatively closer arrangement than typical transmission line configurations that avoids the need for series compensation or any significant amount of series compensation; "compact" means in the range of 10 to 20 feet between any two phases). SIL, a loading level at which the line attains self-sufficiency in reactive power (i.e., no net reactive power into or out of the line), is a convenient "yardstick" for measuring relative loadabilities of long lines operating at similar, or dissimilar, nominal voltages.

The design of FIG. 1 employs up to four (or more) conductors per phase, offering significant gains in thermal capacity and energy efficiency of the line. In situations where four-conductor or larger bundles are deemed unnecessary for thermal reasons, the present invention can be used with three- or two-conductor bundles with associated cost reductions, although some loss of SIL will result. Alternately, the higher cost of larger bundles can be reduced with smaller-diameter conductors, while preserving much of the SIL improvement. Also, the higher cost of larger bundles can be offset by power and energy savings due to greater line efficiency. These changes would represent a refinement of the present invention design described herein.

Considering the sensitivities involved in transmission line placement, the low overall height and aesthetic appearance of the new design are expected to enhance public acceptance of new transmission projects. The new design is efficiently accommodated within a typical right-of-way (ROW), 150 feet wide for 345 kV construction.

Figure 2:
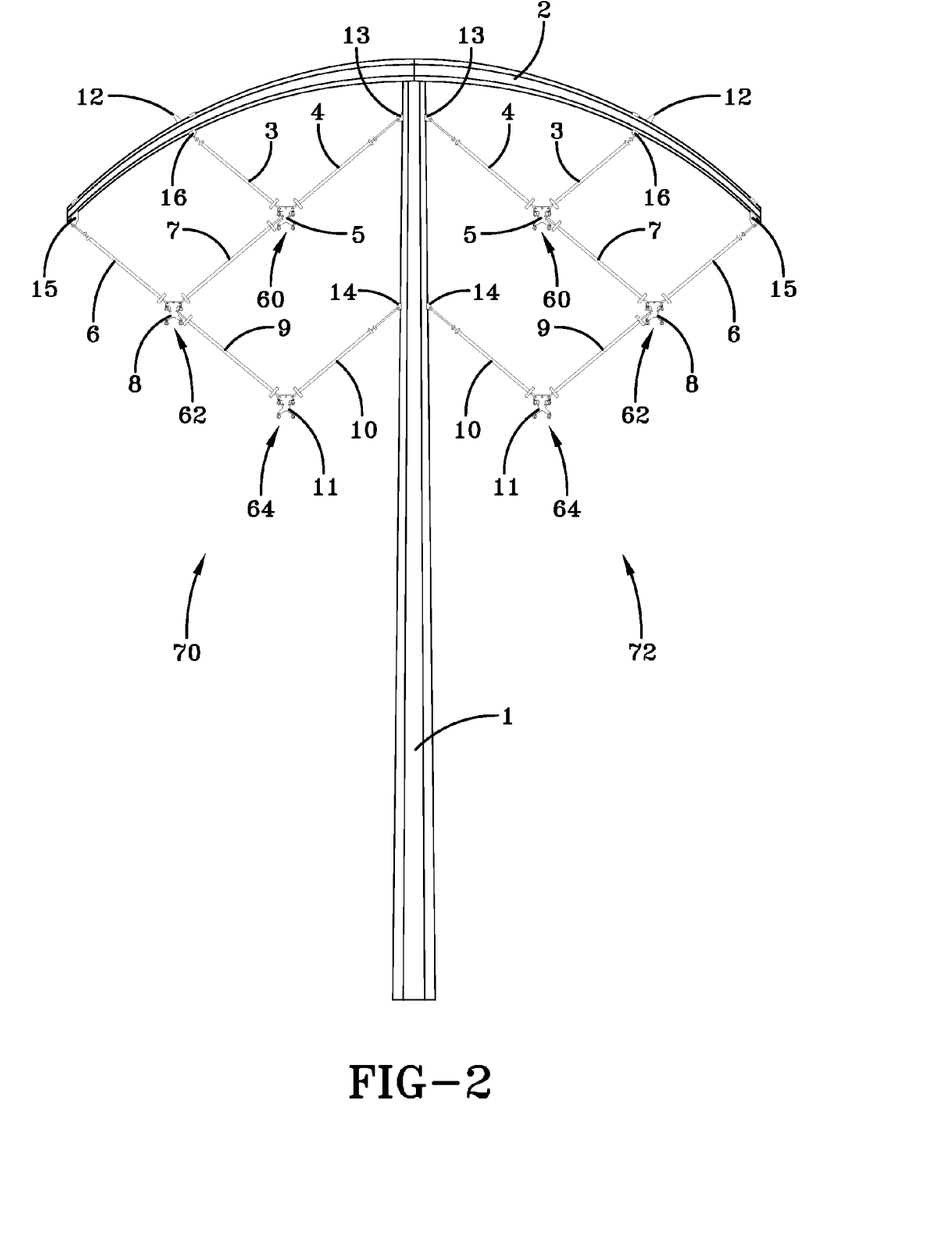
FIG. 2 illustrates the preferred embodiment of the transmission line of the present invention (schematic)

FIG. 2 shows a schematic of the 345 kV double-circuit design illustrated in FIG. 1. It preferably includes a single steel pole shaft (1) supporting an arch-shaped tubular steel crossarm (2), which imparts a streamlined, aesthetic, low-profile appearance. The average overall structure height, at approximately 100 feet, is about 30% lower than that of a traditional 345 kV double-circuit design with the same attachment height of the bottom phase conductor bundle. Each phase contains multiple conductors forming a bundle approximately 16 to 32 inches in diameter. Spacings among the three phases in the example embodiment (approximately 14 feet, 14 feet and 18 feet) are maintained using interphase insulators (7) and (9). These dimensions and bundle/phase arrangements can vary, provided the required interphase clearances are maintained to protect line workers and the public. The crossarm (2) supports preferably two ground/shield wires (12), which are positioned to provide preferred zero-degree shield angle to the outmost phase conductor bundle (62).

Arch-shaped tubular steel crossarm, as shown in FIG. 2, is preferred; it provides the insulator assembly attachment points at the desired positions while having a simple and elegant appearance. The crossarm shape can be varied from an arch with the radius of 30-50 feet to a straight arm as long as the attachment points for the insulator assemblies maintain the required phase-to-ground and phase-to-phase clearances.

The preferred configuration of the new 345 kV design employs interphase insulators, which hold phase conductor bundles in a compact delta configuration, and other insulators that attach each of these bundles to the structure/crossarm body to minimize the risk of phase-to-phase faults. The internal angle between the insulator pairs (3) and (4), (6) and (7), (9) and (10) is preferred at 100 degrees but can vary from 60 to 120 degrees. The preferred angle will maintain both sides of V-string insulators in tension under a wind loading of up to 6 psf, which corresponds to wind speed of about 50 mph. Insulators (3), (4), (6) and (10) could be ceramic, glass or polymer, for example.

The interphase insulators (7) and (9) will have the capacity to withstand the design tension, compression, and torsional loads and maintain the phase-to-phase dry-arc distance and leakage distance requirements. The net distance between the grading rings (if required) of the interphase insulator is preferably not less than 9.25 feet. The interphase insulators (7) and (9) will preferably have the same contamination performance as the other insulators used in the V-string. This will result in the actual leakage distance being longer than that of the phase-to-ground insulator by a factor of the square-root of three. Polymer insulators can provide a higher ratio of leakage distance over dry-arc distance to fit more leakage distance into the same overall section length. Silicone rubber polymer insulators are preferable due to higher flashover stress capability compared with ethylene propylene diene monomer (EPDM) rubber polymer insulators and standard ceramic or glass insulators.

Grading rings, if required, are preferably installed on both ends of the polymer insulators. For ceramic or glass insulators, this need is established by electrical testing. The grading rings and their attachments should withstand the electric arcs of a flashover across the insulator and those from a lightning strike. These rings and end fittings should preferably be corona free under dry conditions. The 60 Hz electric field on any part of the polymer portion of the insulator preferably should not exceed 0.42 kVrms/mm for more than a distance of 10 mm measured along the longitudinal axis of the insulator.

As shown in FIG. 2 for Circuit No. 1 (70), insulator (3) is suspended from the arch-shaped tubular steel crossarm (2) via a connection plate known as through-yang (16). Insulator (4) is attached to the tubular steel shaft (1) via a through-yang (13). In turn, insulators (3) and (4) suspend yoke plate (5) for a first phase conductor bundle (60). Insulator (6) is suspended from the crossarm (2) via a through-yang (15), and insulator (7) is suspended from yoke plate (5). Insulators (6) and (7) suspend yoke plate (8) for a second phase conductor bundle (62). Insulator (9) is suspended from yoke plate (8), and insulator (10) is attached to the tubular steel shaft (1) via a through-yang (14). Insulators (9) and (10) suspend yoke plate (11) for a third phase conductor bundle (64). The insulators, through-vangs and yoke plates in Circuit No. 2 (72) are arranged similarly to the corresponding components in Circuit No. 1 (70). A structure of such a configuration may have an approximate height of 100 feet in flat terrain conditions.

Figure 3:
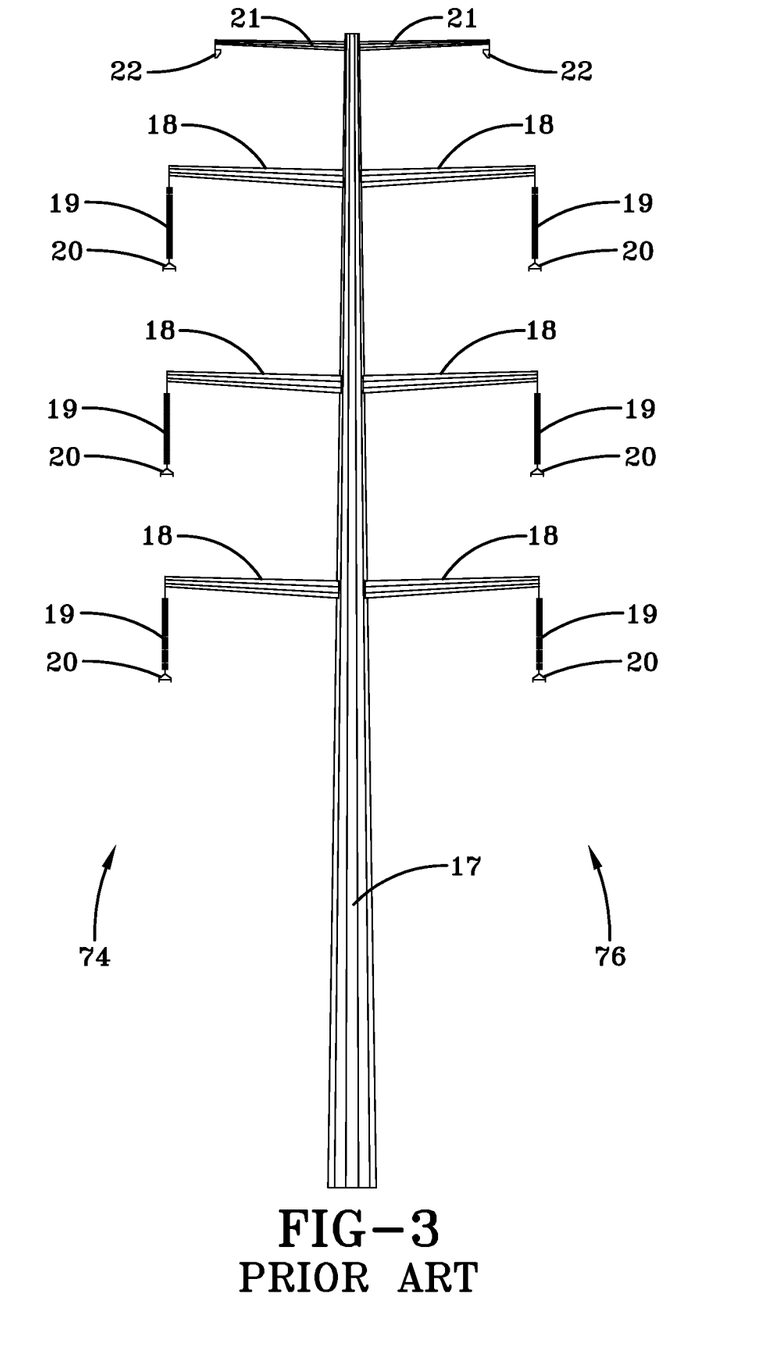
FIG. 3 illustrates one typical 345 kV transmission line in use (prior art)

For comparison, a typical 345 kV double-circuit pole structure, having circuit one (74) and circuit two (76), in use today is shown in FIG. 3. Six conductor crossarms (18) and two shield wire arms (21) are supported by a single steel pole shaft (17). Insulator I-string hardware assembly (19) is suspended from the end of each conductor crossarm (18) and suspends a two-conductor phase bundle (20). The shield wire hardware assembly (22) is attached at the end of each of the two shield wire arms (21). Vertical spacings among the three-phases can vary, but in this structure they are 25.5 feet, 25.5 feet and 51 feet. A structure of such a configuration may have an approximate height of 150 feet in flat terrain conditions.

Table 1 summarizes examples of the physical and electrical characteristics of a typical 345 kV double-circuit line design and three variations of one embodiment of the present invention using two-, three-, and four-conductor bundling arrangements. Of particular interest are the improvements in SIL, impedance, and energy loss properties, which directly influence line loadability and efficiency. These are key considerations in any transmission development built to carry large blocks of power over long distances. Table 1 also provides a comparison between the new and typical line designs' thermal ratings, EMF and audible noise emissions, installed costs, and cost effectiveness expressed in dollars per mile per SIL megawatts. The latter is a more complete measure of the transmission line cost and, when full life cycle costs are considered, it further underscores the advantage of the new design.

TABLE 1

Comparison of Typical and Present Invention 345 kV Line Designs

| | Typical 345 kV DESIGN | | NEW 345 kV DESIGN | | | |
|---|---|---|---|---|---|---|
| Phase Conductor Bundle | 2-954 kCM ACSR Cardinal (18" Spacing) | 2-954 kCM ACSR Cardinal (18" Spacing) | | 3-795 kCM ACSR Drake (30" Bundle Dia.) | | 4-795 kCM ACSR Drake (30" Bundle Dia.) |
| Phase Spacing (Feet) (Phases 1-2/2-3/3-1) | Actual 25.5/25.5/51.0 | Planned 14.0/14.0/18.0 | | Planned 14.0/14.0/18.0 | | Planned 14.0/14.0/18.0 |
| Structure Height (Feet) | 145.5 | 99 | −32% | 99 | −32% | 99 | −32% |
| | | EACH CIRCUIT: | | | | |
| Resistance (Ω/100 Miles) | 5.01 | 4.96 | −1.0% | 3.93 | −22% | 2.96 | −41% |
| Surge Impedance (Ω) | 284 | 243 | −14% | 194 | −32% | 178 | −37% |
| Surge Impedance Loading (MW) | 420 | 490 | +17% | 610 | +45% | 670 | +60% |
| Thermal Rating (A)[1] | 2,246 | 2,246 | 0% | 3,075 | +37% | 4,100 | +83% |
| | | BOTH CIRCUITS COMBINED: | | | | |
| Resistive Loss (MW/100 Miles)[2] | 84 | 83 | −1.2% | 66 | −21% | 50 | −41% |
| Corona Loss (MW/100 Miles)[3] | 1.0 | 2.3 | +130% | 1.6 | +60% | 0.8 | −20% |
| Audible Noise @ ROW Edge (dBA)[4][5] | 44 | 53 | +20% | 44 | 0% | 37 | −16% |
| Electric Field @ ROW Edge (kV/m)[4] | 0.5 | 0.6 | +20% | 0.8 | +60% | 0.9 | +80% |
| Magnetic Field @ ROW Edge (mG)[4] | 116 | 54 | −53% | 54 | −53% | 54 | −53% |
| Installed Cost ($M/100 Miles)[6] | 151 | 140 | −7% | 164 | +9% | 190 | +26% |
| Cost Effectiveness ($/MW-Mile)[7] | $1,798 | $1,429 | −21% | $1,344 | −25% | $1,418 | −21% |

Notes:
[1]Summer rating for continuous operation in AEP (Western Region)
[2]Line loss based on 1000 MVA loading in each of two circuits
[3]Yearly average corona loss (rain 20%, snow 2%, fair 78% of time)
[4]Results are shown for "superbundle" phase arrangement (Phases 1-2-3; 1-2-3, top-to-bottom); other arrangements are possible. Right-of-way (ROW) width is 150 feet
[5]Mean value of audible noise in rain at sea level
[6]Estimated line cost based on NESC Heavy loading zone Grade B design criteria
[7]Cost effectiveness based on SIL MW capability (two circuits)

As demonstrated, SIL improvements and impedance reductions approaching 60% and 40%, respectively, are achievable with one embodiment of the 345 kV design of the present invention using streamlined, low-profile structures and phase-conductor bundles arranged into compact delta configurations. Also, by using three- or four-conductor phase bundles, significant gains are attained in thermal capacity and energy efficiency of the line, both resulting in lower operating temperatures. A secondary benefit of these improvements is to help unload higher-impedance/lower-capacity lines in the transmission system, thus improving the overall system performance.

Other benefits include: (i) reduced ground-level audible noise, which is comparable to that encountered in a library environment, and (ii) low EMF levels corresponding to a fraction of the applicable industry guidelines, even during most demanding operating conditions.

Ground-level electric fields produced by the present invention and typical designs are very weak, although electric fields associated with the former are higher. Both fields, computed at the line ROW edge, are well within the corresponding industry guideline (5 kV/m). Magnetic field, which presently receives more attention in the scientific community and line siting proceedings, is halved for the same line loading conditions in this embodiment. Depending on the application, further reductions in electric and/or magnetic fields are possible by using other phasing arrangements from that assumed in Table 1.

In the preferred embodiment, ACSR (Aluminum Conductor Steel Reinforced) and symmetrical bundles are considered; however, different conductor types and/or asymmetrical bundles can be used in the present invention with varied effects on cost, electrical and mechanical performance of the line.

All three variations of the present invention design as demonstrated in the embodiment related to Table 1 are more cost-effective on a $/MW-mile basis than the typical design owing to their greater loadabilities. Moreover, in projects that normally would require series compensation, the avoided cost is the cost of installing and maintaining/replacing the compensation equipment (including SSR/SSCI assessment and/or mitigation costs) over the long term, considering the long life expectancy of a transmission line. Such costs, apart from the concerns noted earlier, can be substantial.

The four-conductor option of the 345 kV double-circuit design of the present invention as shown in FIG. 2 also compares favorably with a typical 500 kV line design (where the three-phases are suspended in a horizontal configuration under a tower crossarm). As shown in Table 2, the former, placed on a 150-foot wide ROW, offers a 40% higher SIL than the latter, which is commonly taller and built on a 175-foot ROW. Energy efficiencies and installed costs of the two designs are similar, with the 345 kV design of the present invention being significantly more cost effective due to its higher loadability—an important objective in bulk power transmission development.

Figure 4:
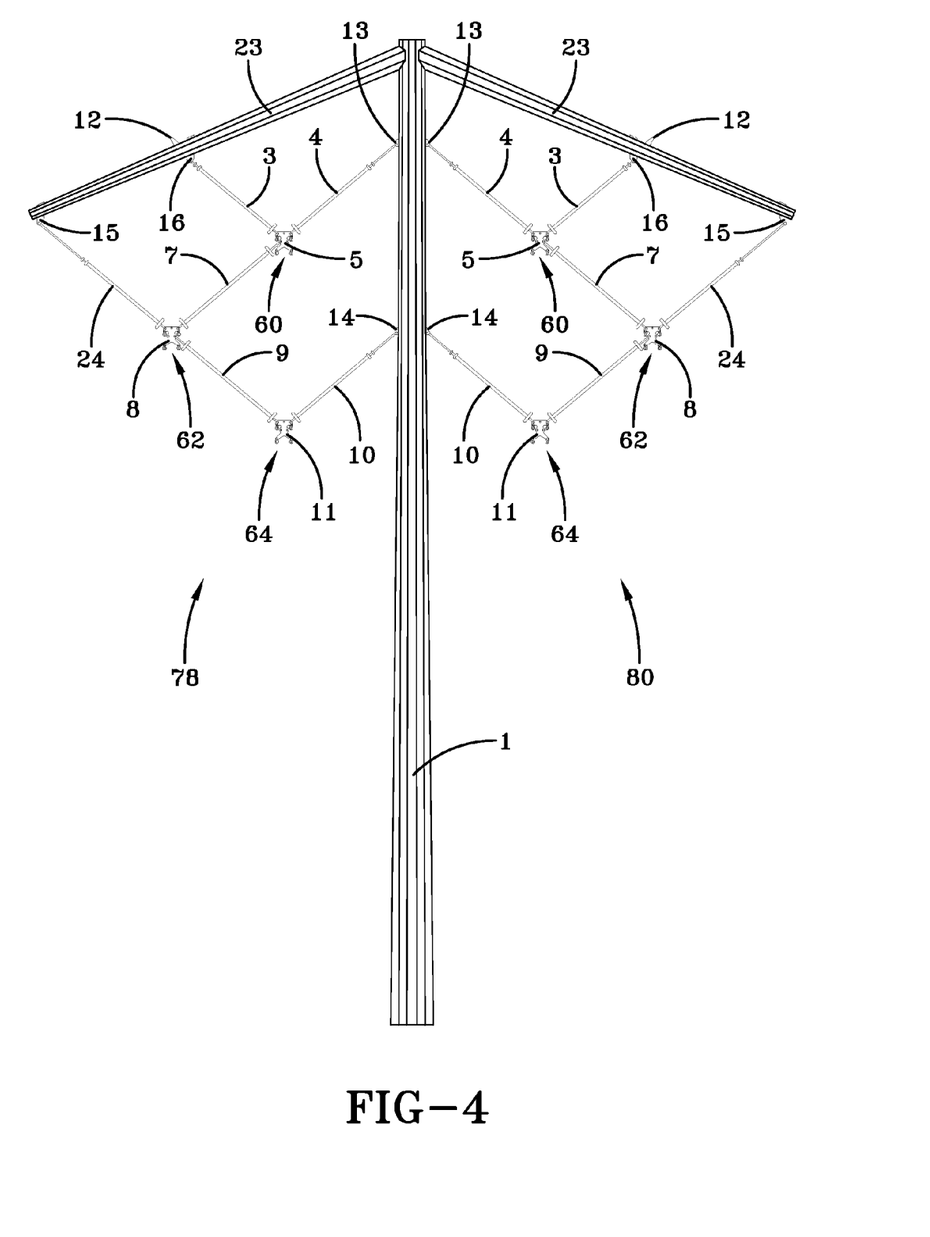
FIG. 4 illustrates another embodiment of the transmission line of the present invention.

It is evident from Table 2 that the design of the present invention cannot be viewed as a substitute for a typical 765 kV transmission line (where the three-phases are suspended in a horizontal configuration under a tower crossarm), but can serve as the next best alternative. Integrating a 765 kV or a 500 kV line with 345 kV transmission would require transformers and other station equipment, the cost of which is not included in this comparison.

the insulator assembly (24) would be different from the corresponding insulator assembly (6) in FIG. 2 to fit this alternative configuration. A structure of such a configuration may have an approximate height of 105 feet in flat terrain conditions.

Figure 5:
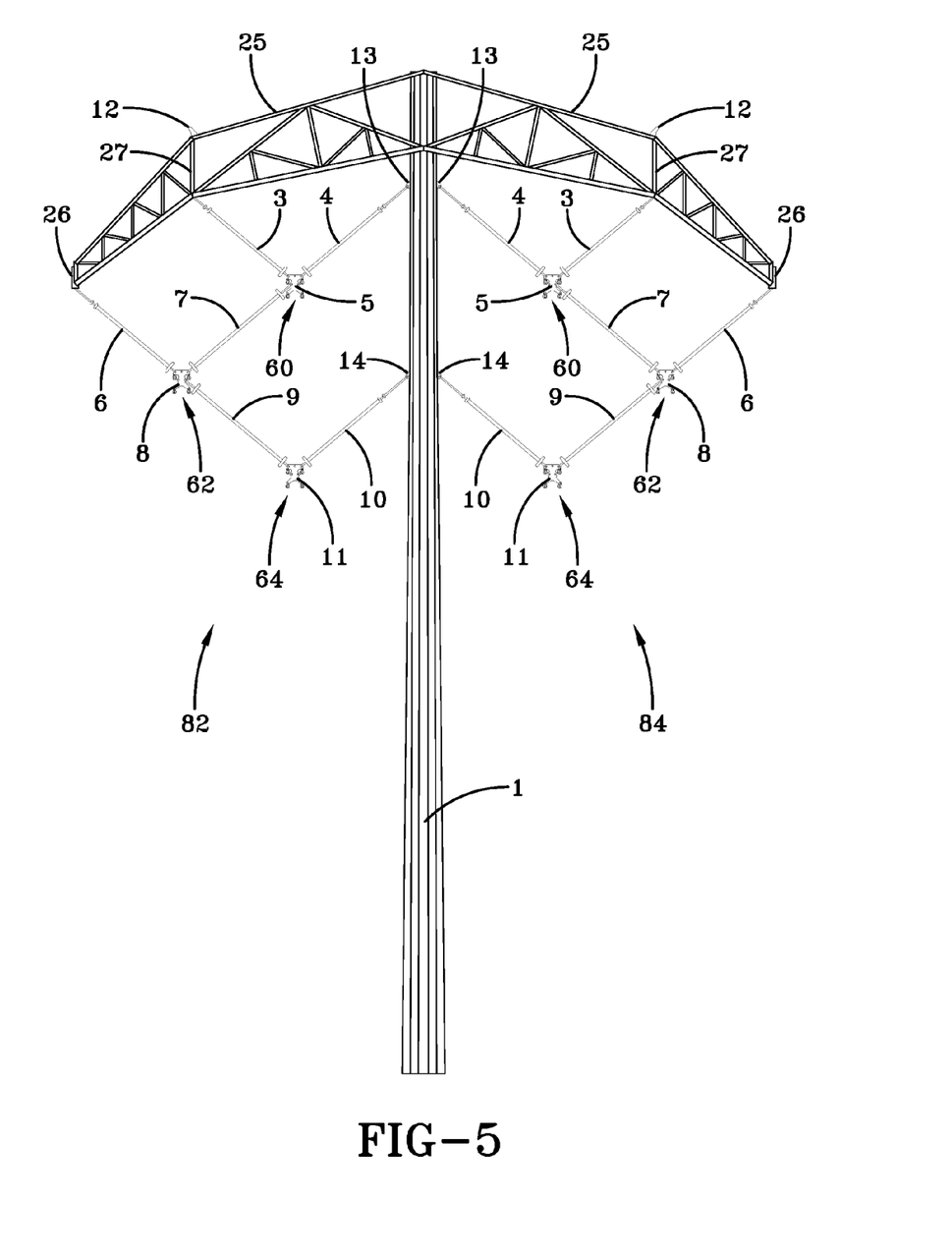
FIG. 5 illustrates another embodiment of the transmission line of the present invention.

FIG. 5 shows another alternative with two arched lattice steel crossarms (25) in place of the single arch-shaped tubular steel crossarm (2) shown in FIG. 2 to support the phase conductors and shield wires (12) for a first circuit (82) and second circuit (84). Attachment plates (26) and (27) on lattice crossarms, and through-vangs (13) and (14) on steel pole shaft (1), provide support for the insulator assemblies. A structure of such a configuration may have an approximate height of 105 feet in flat terrain conditions.

Figure 6:
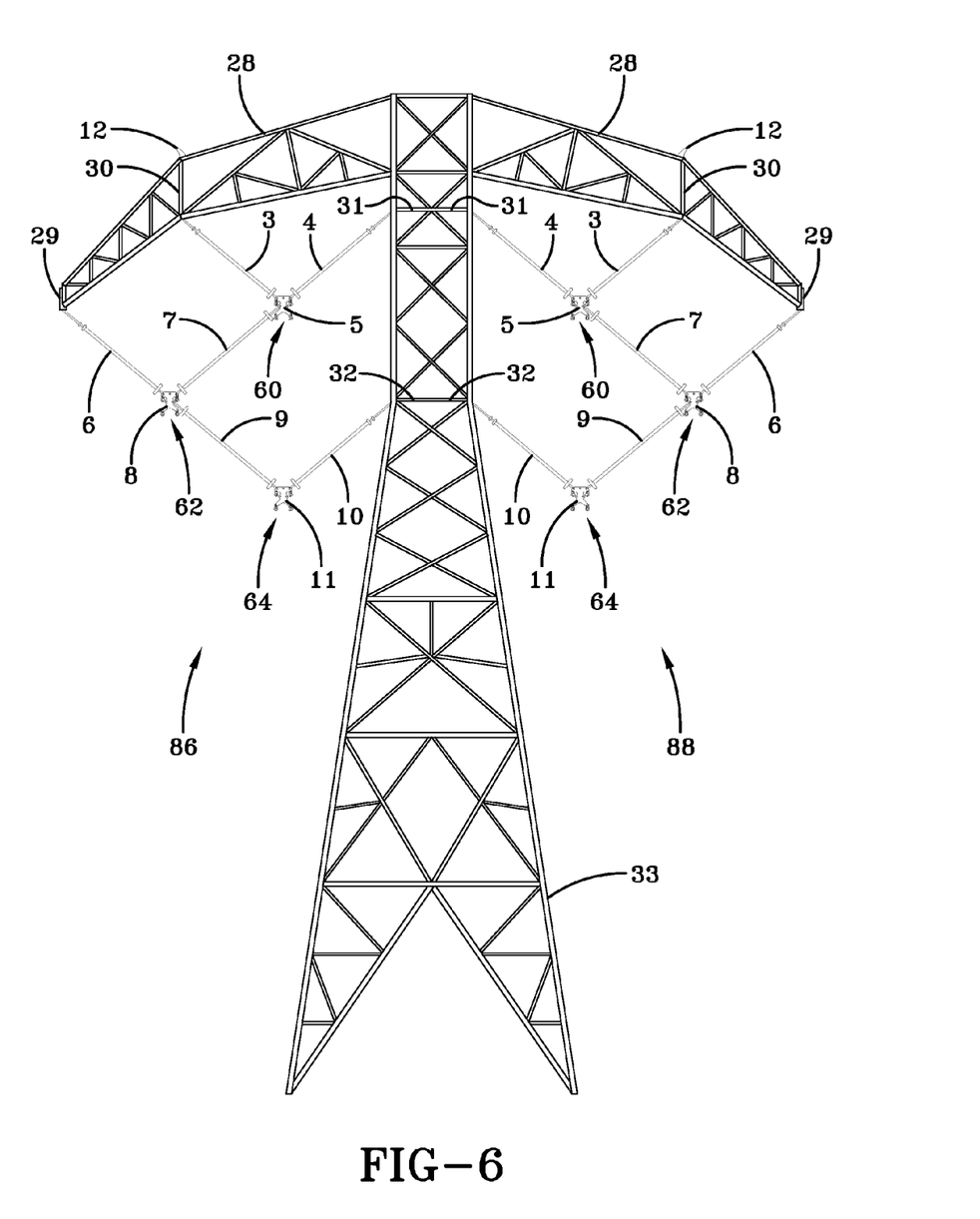
FIG. 6 illustrates another embodiment of the transmission line of the present invention.

FIG. 6 shows still another alternative with lattice-type steel crossarms (28) and tower body (33) to support the phase conductors and shield wires (12) for a first circuit (86) and second circuit (88). In this alternative, attachment plates (29) and (30) on the crossarms, and attachment plates (31) and (32) on the tower body, support the insulator assemblies. This is a cost effective alternative for use with longer spans in mountainous terrain. A structure of such a configuration may have an approximate height of 105 feet in flat terrain conditions.

It is preferred that none of the alternative designs require a change in the physical phase/conductor positions, thus retaining basic electrical properties of the most representative design (refer to FIG. 2), including its load-carrying ability and efficiency.

The above alternatives could simplify the structure fabrication process and reduce costs, but would increase the overall height by 5 to 6 feet. Moreover, they may detract from the line's streamlined appearance (and public acceptance), a significant consideration in crafting the new design.

Figure 7:
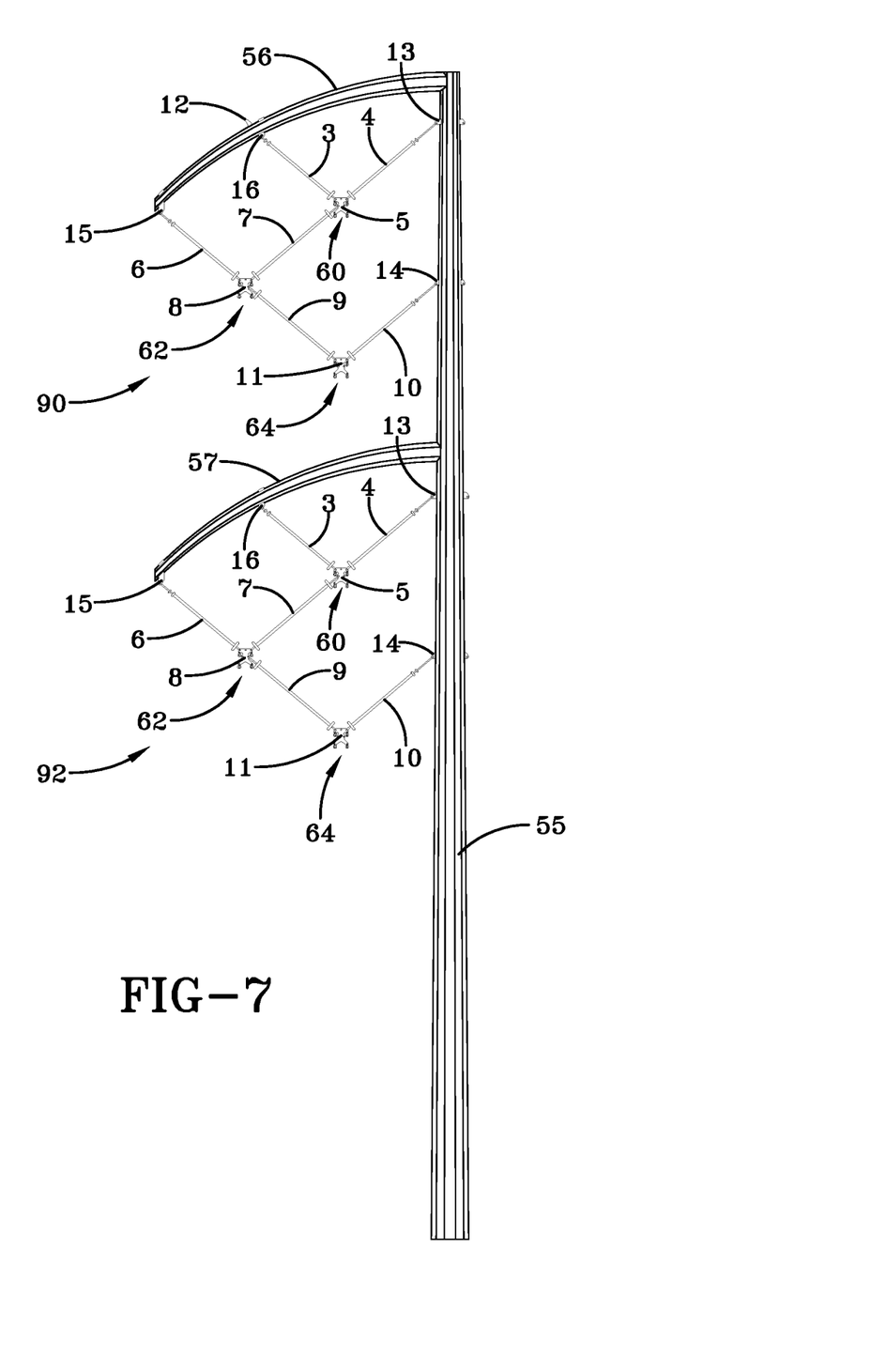
FIG. 7 illustrates another embodiment of the transmission line of the present invention.

FIG. 7 shows a modification of the present invention, where one arch-shaped steel crossarm (56) supports Circuit No. 1 (90) directly above another arch-shaped steel crossarm (57) supporting Circuit No. 2 (92), both on a single tubular pole shaft (55) structure that can be placed within a narrower

TABLE 2

New 345 kV vs. Higher-Voltage Designs

|  | NEW 345 kV DESIGN[1] | 500 kV DESIGN | 765 kV DESIGN |
|---|---|---|---|
| Phase Conductor Bundle | 4-795 kCM ACSR Drake (30" Bundle Dia.) | 3-1113 kCM ACSS Finch (18" Spacing) | 6-795 kCM ACSR Tern (30" Bundle Dia.) |
| Right-of-Way Width (Feet) | 150 | 175 | 200 |
| Surge Impedance Loading (MW) | 1340 | 960 | 2380 |
| Resistive Loss (MW/100 Miles)[2] | 50 | 47 | 14 |
| Corona Loss (MW/100 Miles)[3] | 0.8 | 1.1 | 2.4 |
| Installed Cost ($M/100 Miles)[4] | 190 | 192 | 266 |
| Cost Effectiveness ($/MW-Mile)[5] | $1,418 | $2,000 | $1,118 |

Notes:
[1]Data provided for both circuits, combined, of new 345 kV design
[2]Line loss based on 1000 MVA loading in each 345 kV circuit; 2000 MVA in 500 kV and 765 kV lines
[3]Yearly average corona loss (rain 20%, snow 2%, fair 78% of time)
[4]Estimated line cost based on NESC Heavy loading zone Grade B design criteria
[5]Cost effectiveness based on SIL MW capability In alternative embodiments, both straight-shaped tubular steel crossarms and latticed steel crossarms can be used in place of the single arch-shaped tubular steel crossarm of the double-circuit design of FIG. 2.

FIG. 4 shows an alternative structure configuration of the new design utilizing two straight tubular steel crossarms (23) to support the phase conductors and shield wires (12) for a first circuit (78) and second circuit (80). The length of ROW, less than 150 feet in width. This design can be modified further to include up to two additional circuits, preferably positioned symmetrically from Circuits No. 1 (90) and No. 2 (92), doubling the overall line loadability, within a 150 feet ROW width.

Figure 8:
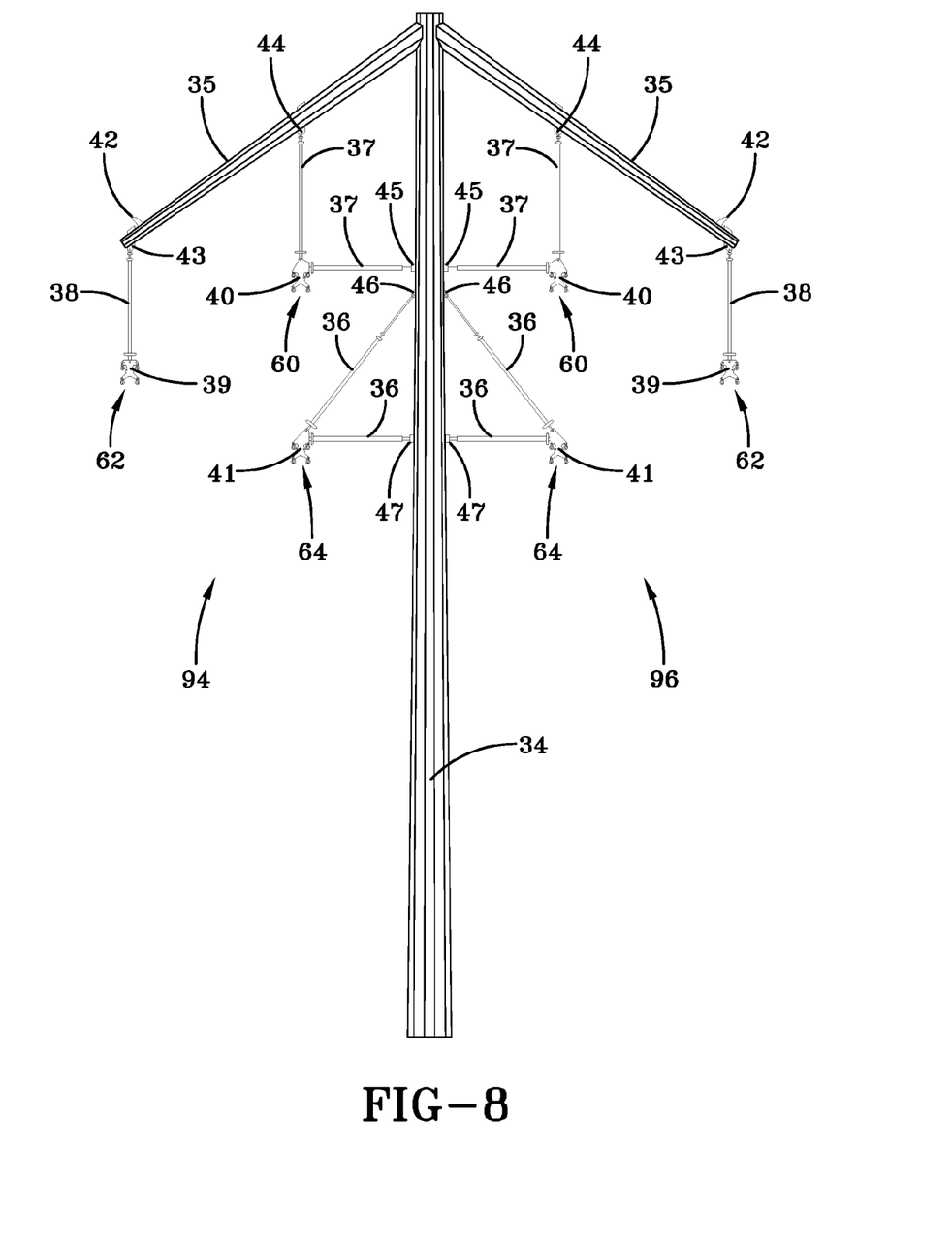
FIG. 8 illustrates another embodiment of the transmission line of the present invention.

FIG. 8 shows yet another modification of the present invention using crossarms (35), braced-post insulator assemblies (36) and (37) similar to those of Lindsey Manufacturing Co., and I-string suspension insulator assemblies (38) to suspend a yoke plate (39) instead of V-string insulator assemblies to keep the phases in a similar delta arrangement with no interphase insulators. Crossarm (35), supports Circuit No. 1 (94) and Circuit No. 2 (96). The spacings among three phases, each with multiple conductors, are increased in this modified design up to approximately 20 feet to maintain I-string blow out clearance under 6 psf winds. The increased phase spacings would result in some loss of SIL capability. Ground/shield wire assemblies (42) are arranged at the ends of the crossarm (35). In this exemplary embodiment, through-yang plates (43) and (44) are used to connect insulators (38) and post insulator assemblies (37) to the crossarm. In addition, yoke plates (40) and (41) are attached to the pole shaft (34) by braced post insulator assemblies (36) and (37). Each insulator assembly (36) and (37) is connected to the pole shaft (34) by through-yang plates (45), (46), and (47).

Figure 9:
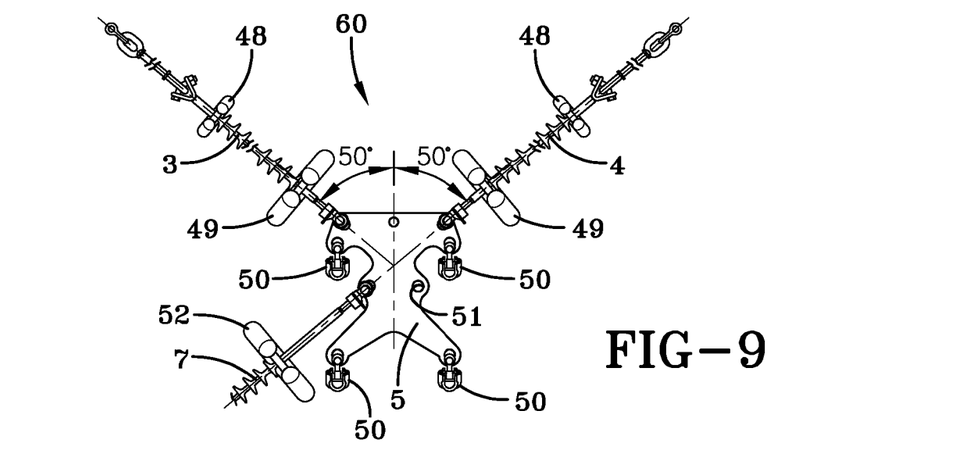
FIG. 9 illustrates one embodiment of the yoke plate for a 4-conductor bundle.

FIG. 9 illustrates one embodiment of a yoke plate designed for phase bundles with four conductors. Attached to this yoke plate (5) are four suspension clamps (50) holding the conductors of phase bundle (60). The plate preferably has four insulator attachment holes (51), two of which are for the insulators (3) and (4), and the third hole is for the interphase insulator (7). The fourth hole in this plate is not used in phase conductor bundle (60); it provides an alternate attachment location for the interphase insulator in other phases of this line design. Both ends of insulators (3), (4) and (7) are preferably equipped with grading rings (48), (49) and (52).

Figure 10:
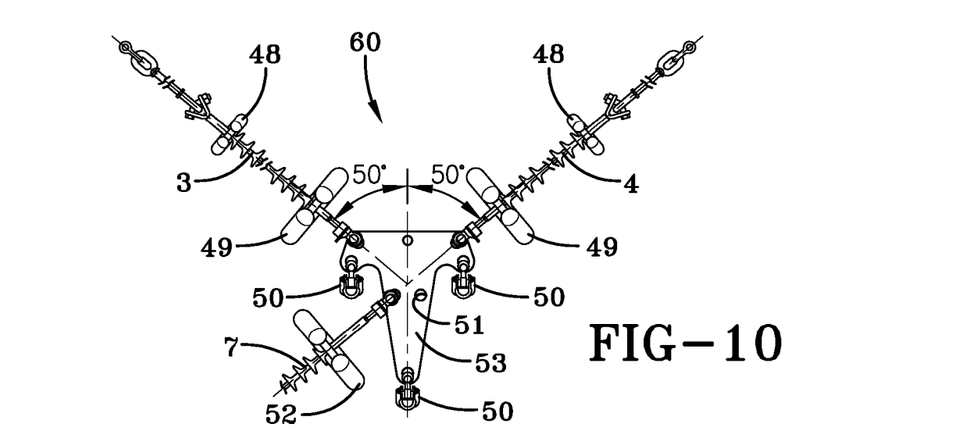
FIG. 10 illustrates one embodiment of the yoke plate for a 3-conductor bundle.

Yoke plate (5) can be replaced by yoke plate (53) for three-conductor phase bundles (FIG. 10), providing support for three suspension clamps (50) that hold conductors of phase conductor bundle (60). This yoke plate also has four insulator attachment holes (51), two of which are for the insulators (3) and (4), and the third hole is for the insulator (7). The fourth hole is not used in phase conductor bundle (60).

Figure 11:
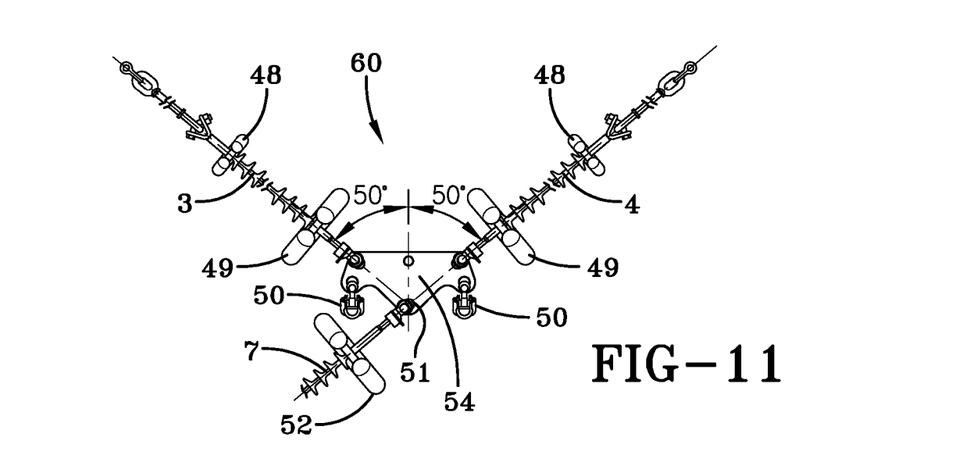
FIG. 11 illustrates one embodiment of the yoke plate for a 2-conductor bundle.

Yoke plate (5) also can be replaced by yoke plate (54) for two-conductor phase bundles (FIG. 11), providing support for two suspension clamps (50) that hold conductors of phase conductor bundle (60). This yoke plate has three insulator attachment holes (51). Two holes are for the insulators (3) and (4), and the third hole is for the insulator (7).

The 345 kV double-circuit line design of the present invention (FIG. 2) provides, in a cost-effective manner, both high capacity and high efficiency for power transmission. In this embodiment, it is comprised of a single arch-shaped tubular steel crossarm supporting two circuits symmetrically about a single tubular pole shaft giving a simple, relatively low profile, aesthetic appearance; six V-string insulator assemblies forming compact delta configurations of phase conductor bundles with up to four (or more) conductors per phase; each phase with at least one insulator connection to the supporting structure, minimizing the risk of faults involving multiple phases; and four interphase insulators, which allow compaction of the line. The 345 kV double-circuit design of FIG. 2 (four-conductor phase bundle) provides improved surge impedance loading of the line, which approaches 670 MW per circuit vs. 420 MW for a traditional design. Further, it lowers both resistive and corona losses, and moderates the EMF and audible noise effects of the line.

The six V-string insulator assemblies preferably include eight phase-to-ground insulators and four interphase insulators. These insulators can be ceramic, glass or polymer insulators, for example. The internal angle between both sides of the V-string insulators is preferred at 100 degrees, but can vary in the 60 to 120 degree range.

In the preferred embodiment, the insulator should meet two primary requirements: it must have: (i) an electrical resistivity, and (ii) a dielectric strength sufficiently high for the given application. The secondary requirements relate to the thermal and mechanical properties. In certain situations, tertiary requirements relating to dielectric loss and dielectric constant also must be observed. In the preferred embodiment, the insulator properties should not deteriorate in a given environment and desired lifetime.

The transmission line of the present invention is flexible and can accommodate two-, three-, four-conductor or larger phase bundles. Different conductor types and/or asymmetrical bundles can be used with varied effects on cost, electrical and mechanical performance. Interphase spacings are controlled by the phase-to-phase dry arc distance for the lightning and switching impulse overvoltages between the grading rings, and the leakage distance that is longer than the phase-to-ground insulation by a factor of the square-root of three.

Two ground/shield wires preferably are installed on top of the single arch-shaped crossarm, providing preferred zero-degree shield angle for the outmost phase conductors.

The single arched tubular steel crossarm of the new design can be substituted with two straight tubular steel crossarms or two lattice steel crossarms while requiring no change in the physical phase conductor positions, thus retaining basic electrical properties of the preferred design.

The single arched tubular steel crossarm and single steel pole shaft can be substituted with a lattice steel crossarm and a lattice steel tower body, respectively, keeping the phase conductor arrangement (and line's electrical properties) unchanged.

Circuit No. 1 can be installed directly above Circuit No. 2 on a single structure by using two arch-shaped steel crossarms without affecting the phase arrangements. This modification of the present invention can be placed within a narrower ROW, less than 150 feet wide. The design can be modified further to include up to two additional circuits, preferably positioned symmetrically from Circuits No. 1 and No. 2, doubling the overall line loadability on a 150-foot ROW.

The V-string insulator assemblies can be substituted with braced-post-insulator and I-string suspension-insulator assemblies to keep the phases in a similar delta configuration with no interphase insulators. However, this modification may require increased phase spacings, resulting in some loss of SIL capability.

The new design offers a viable, elegant, cost-effective alternative to the use of series-compensated 345 kV lines and/or higher-voltage lines now required for long-distance bulk power transportation.

While certain embodiments of the present invention are described in detail above, the scope of the invention is not to be considered limited by such disclosure, and modifications are possible without departing from the spirit of the invention as evidenced by the following claims:

What is claimed is:

1. A transmission tower structure for suspending an overhead power line, comprising: a tower structure comprising a vertical pylon and a cantilevered arm having a distal end relative to the vertical pylon; first, second, and third phase conductor bundles for transmitting electrical power in an electrical power transmission system, each conductor bundle comprised of multiple spaced-apart conductors, and each conductor bundle for transmitting electrical power at a different electrical phase angle; first, second, and third v-string insulator units for suspending the first, second, and third conductor bundles, respectively, such that each conductor bundle hangs below both a first leg and a second leg of the respective v-string insulator unit from which it is suspended, wherein the first leg of the first v-string insulator unit is attached to the vertical pylon and the second leg of the first v-string insulator unit is attached to the cantilevered arm between the distal end and the vertical pylon, the first leg of the second v-string insulator unit is attached to the first v-string insulator unit and the second leg of the second v-string insulator unit is attached to the distal end of the cantilevered arm, and the first leg of the third v-string insulator unit is attached to the vertical pylon below the first leg of the first v-string insulator unit, and the second leg of the third v-string insulator unit is attached to the second v-string insulator unit; and wherein the suspended first, second and third conductor bundles form a delta configuration with the distal end of the cantilevered arm closer to the second conductor bundle than the first and third conductor bundles.

2. The transmission tower structure according to claim 1, wherein the first conductor bundle is suspended through tension on both the first and second legs of the first v-string insulator unit; the second conductor bundle is suspended through tension on both the first and second legs of the second v-string insulator unit; and the third conductor bundle is suspended through tension on both the first and second legs of the third v-string insulator unit.

3. The transmission tower structure according to claim 1, wherein the first and second legs of the second v-string unit support through tension at least some of the weight of the third conductor bundle.

4. The transmission tower structure according to claim 1, wherein the first and second legs of the first v-string unit support through tension a least some of the weight of the second and third conductor bundles.

5. The transmission tower structure according to claim 1, wherein:

each of the first and second legs of the first v-string insulator unit, the second leg of the second v-string insulator unit, and the first leg of the third v-string insulator unit comprises a phase-to-ground insulator; and each of the first leg of the second v-string insulator unit and the second leg of the third v-string insulator unit comprises a phase-to-phase insulator.

6. The transmission tower structure according to claim 1, wherein the suspended first, second, and third conductor bundles form a compact delta configuration.

7. The transmission tower structure according to claim 6, wherein the compact delta configuration includes a phase-to-phase spacing of about 10 to 20 feet between the centers of any two conductor bundles, and internal angles between the first, second, and third conductor bundles between 30-120 degrees, and where a nominal operating voltage of the conductor bundles is 345 kV.

8. The transmission tower structure according to claim 6, wherein the compact delta configuration includes phase-to-phase spacing of about 14 to 20 feet between the centers of any two conductor bundles, with internal angles between the first, second, and third conductor bundles between 30-120 degrees, and where the nominal operating voltage of the conductors bundles is 345 kV.

9. The transmission tower structure according to claim 1, wherein each of the first and second legs of the first, second and third v-string insulator units remain in tension when loaded by a wind force of up to 6 psf.

10. The transmission tower structure according to claim 1, wherein the first, second and third v-string insulator units together support the entire weight of the first, second and third conductor bundles.

11. The transmission tower structure according to claim 1, wherein the third conductor bundle is suspended substantially beneath the first conductor bundle.

12. The transmission tower structure according to claim 1, wherein the cantilevered arm is an arched cantilevered arm.

13. The transmission tower structure according to claim 1, wherein the cantilevered arm is straight.

14. The transmission tower structure according to claim 13, wherein the straight cantilevered arm is angled downward.

15. The transmission tower structure according to claim 1, wherein the cantilevered arm is a latticed steel cantilevered arm.

16. The transmission tower structure according to claim 1, wherein the tower structure comprises a single vertical pylon, the cantilevered arm extending from the single vertical pylon.

17. The transmission tower structure according to claim 1, wherein the vertical pylon comprises a latticed tower body, the cantilevered arm extending from the latticed tower body.

18. The transmission tower structure according to claim 1, wherein the height of the tower structure above ground is less than 100 feet.

19. A transmission tower structure for suspending an overhead power line, comprising: a tower structure including a vertical pylon and a cantilevered arm having a distal end relative to the vertical pylon; first, second, and third phase conductor bundles for transmitting electrical power in an electrical power transmission system, each conductor bundle comprised of multiple spaced conductors, and each conductor bundle for transmitting electrical power; first, second, and third v-string insulator units connected to the first, second, and third conductor bundles, respectively, wherein the first v-string insulator unit has a first leg attached to the vertical pylon and a second leg attached to the arm between the distal end and the vertical pylon, and supports, through tension in both of the first and second legs of the first v-string insulator unit, the weight of the first conductor bundle and a portion of the weight of the second and third conductor bundles, the second v-string insulator unit has a first leg attached to the first v-string insulator unit and a second leg attached to the distal end of the cantilevered arm, and supports, through tension in both of the first and second legs of the second v-string insulator unit, the weight of the second conductor bundle and a portion of the weight of the third conductor bundle, and the third v-string insulator unit has a first leg attached to the vertical pylon below the first led of the first v-string insulator unit, and a second leg attached to the second v-string insulator unit, and supports, through tension in both of first and second legs of the third v-string insulator unit, the weight of the third conductor bundle; wherein each conductor bundle hangs below both the first leg and the second lea of the respective v-string insulator unit from which it is suspended; and wherein the suspended conductor bundles form a compact delta configuration with a phase-to-phase spacing of about 10 to 20 feet between the centers of any two conductor bundles.

20. A transmission tower structure, comprising:

the tower structure including a vertical pylon, and a cantilevered arm having a distal end relative to the vertical pylon; first, second, and third conductors; first, second, and third insulator units configured to suspend the first, second, and third conductors respectively, whereby each of the conductors hangs below both a first lea and a second lea of the respective insulator unit from which it is suspended, and the distal end of the cantilevered arm is closer to the second conductor than to the first and third conductors; the first leg of the first insulator unit is attached to the vertical pylon and the second leg of the first insulator unit is attached to the cantilevered arm between the distal end and the vertical pylon; the first leg of the second insulator unit is attached to the first insulator unit and the second leg of the second insulator unit is attached to the distal end of the cantilevered arm; and the first leg of the third insulator unit is attached to the vertical pylon below the first lea of the first insulator unit, and the second leg of the third insulator unit is attached to the second insulator unit.

21. The transmission tower structure of claim 20, wherein the vertical pylon is further from the second conductor than from the first and third conductors.

22. The transmission tower structure of claim 20, wherein each of the conductors is a conductor bundle that includes one to four spaced-apart conductors.

23. The transmission tower structure of claim 20, wherein each of the conductors is configured to transmit electrical power.

24. The transmission tower structure of claim 20, wherein the second conductor is directly connected to a through-yang on the distal end of the cantilevered arm by an insulator of the second v-string insulator unit.

25. The transmission tower structure according to claim 20, wherein a connection between the second conductor and the cantilevered arm has no other conductor disposed therebetween.

* * * * *

UNITED STATES PATENT AND TRADEMARK OFFICE
CERTIFICATE OF CORRECTION

PATENT NO. : 9,768,601 B2  
APPLICATION NO. : 14/563122  
DATED : September 19, 2017  
INVENTOR(S) : Meihuan Zhu Fulk et al.

Page 1 of 1

It is certified that error appears in the above-identified patent and that said Letters Patent is hereby corrected as shown below:

In the Claims

In Claim 19, Column 12, Line 63, change "lea" to --leg--.

In Claim 20, Column 13, Line 8, change both occurrences of "lea" to --leg--.

Signed and Sealed this  
Tenth Day of April, 2018

Andrei Iancu  
*Director of the United States Patent and Trademark Office*